July 7, 1970            H. J. FRANK            3,519,911
ALTERNATING CURRENT MOTOR STARTING CONTROL
Filed July 5, 1966
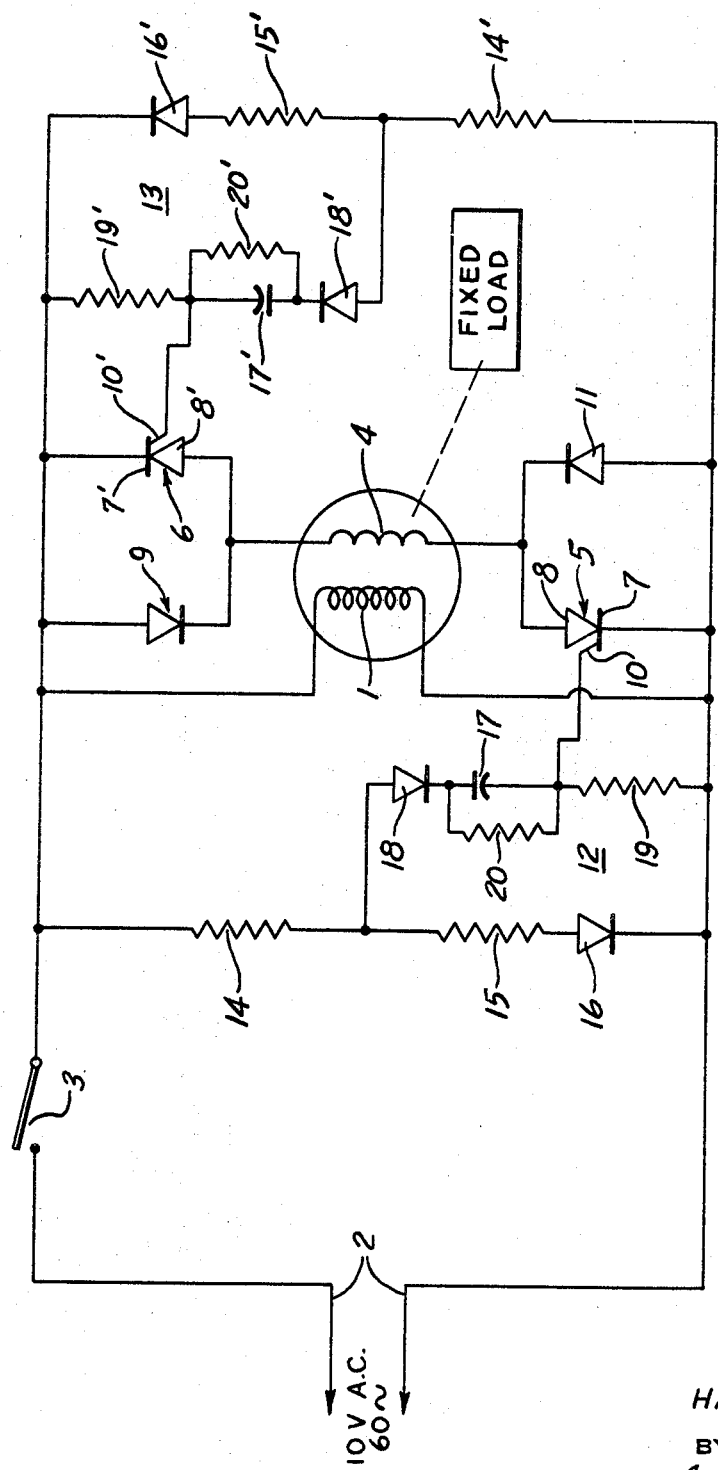
INVENTOR
HARRY J. FRANK
BY
Andrus & Starke
ATTORNEYS

United States Patent Office 3,519,911
Patented July 7, 1970

3,519,911
ALTERNATING CURRENT MOTOR STARTING CONTROL
Harry J. Frank, Box 357C, Rte. 1,
Cedarburg, Wis. 53012
Filed July 5, 1966, Ser. No. 562,559
Int. Cl. H02p 1/44
U.S. Cl. 318—221    10 Claims

ABSTRACT OF THE DISCLOSURE

This disclosure relates to a motor having the start winding connected to the incoming alternating current power lines through alternately conductive circuit branches each of which includes a controlled rectifier. A capacitor is connected in a charging circuit directly across the power lines with the gate element connected to a point in the charging circuit. When the supply voltage is supplied to the power lines, pulsating current is supplied to the capacitor charging circuit. Gate current flows to the respective silicon controlled rectifiers, until such time as the capacitors approach a fully charged state. At such time, the capacitors prevent further gate current and the silicon controlled rectifiers revert to the normal blocking state thereby opening the circuit to the starting winding.

---

This invention relates to an alternating current motor start control and particularly to the timed interconnection of a starting winding in the motor circuit.

Single phase alternating current motors are conveniently constructed with a run winding and a start winding interconnected to the incoming power lines through a circuit means inserting the start winding during initial energization and until such time as the motor has reached or approached an operating speed. Thereafter the start winding is removed from the circuit.

Generally, the start winding has been removed from the circuit through a speed sensitive switch such as a centrifugally operated switch. Alternatively, current operated relays have been suggested. More recently, the use of silicon controlled rectifiers in combination with a current sensing transformer have been proposed to insert the start winding only during the initial starting when the current is high as a result of the starting effects of the motor.

Although systems heretofore provided for starting of alternating current motors have been more or less satisfactory, the mechanical or centrifugal switches have the problem normally associated with mechanical switching devices such as contacts burning, adjustment and mechanical fouling and failure. Current responsive systems have generally been relatively complicated and have not found wide application particularly in small fractional alternating current motors.

The present invention is particularly directed to a simplified and improved start switching means for timed insertion of the starting winding in the motor circuit of an alternating current motor. Generally, the present invention is particularly adapted for switching of alternating current motors connected to a generally fixed load.

In accordance with the present invention, the start winding is connected to the incoming power lines through alternately conductive circuit branches each of which includes a controlled rectifier or similar solid state triggered device. The firing element of the rectifier is connected to a timing circuit energized directly from the power lines to provide for timed energization of the controlled rectifier after application of power to the motor circuit for supplying energy to the run winding. The timing circuit preferably takes the form of a capacitor connected in a charging circuit directly across the power lines with the gate element connected to a point in the charging circuit. Thus, when the supply voltage is supplied to the power lines, pulsating current is supplied to the capacitor charging circuit. This applies gate current to the respective silicon controlled rectifiers until such time as the capacitors approach a fully charged state. At such time, the silicon controlled rectifiers will not conduct because the charge on the capacitors prevents further gate current and the silicon controlled rectifiers revert to the normal blocking state thereby opening the circuit to the starting winding.

The starting winding is in accordance with the present invention connected in the circuit for a fixed time and is therefore particularly useful in connection with driving of a fixed load in which the same torque characteristic is required.

The capacitors are preferably connected in circuit with a suitable discharge means to maintain their charge at a level preventing turning on of the silicon controlled rectifier for a predetermined time after the removal of power. For example, the discharge time may be selected as four seconds. This will eliminate the recycling and energizing the starting winding due to momentary power interruption or the like.

The present invention employs a completely different concept from that hertofore employed in the starting of alternating current single phase motors. The present invention is based on the concept of employing the connection of the strating winding in circuit for a fixed time period rather than in accordance with the speed or current supplied to the motor. This has the distinct advantage in providing a simple and reliable long life solid state switching means for interconnecting the starting winding in the circuit.

The present invention thus provides a very simple and reliable means for starting of alternating current single phase motors particularly where a generally fixed load is employed.

The drawing furnished herewith illustrates a preferred construction of the present invention in which the above advantages and features are clearly disclosed as well as others which will be clear from the following description.

The drawing is a schematic circuit diagram of an alternating current motor constructed in accordance with the present invention.

Referring to the drawing, the present invention is shown applied to a single phase alternating current motor including a running winding 1 adapted to be connected to a set of incoming power lines 2 by an on-off switch 3. A start winding 4 is connected through a special switching circuit in parallel with the winding 1. In accordance with the usual practice, the starting winding 4 is wound in the motor to provide a magnetic field phase displacement with respect to the run winding 1 such that the simultaneous energization of the windings from the power lines 2 creates a starting or turning torque on the rotor of the motor. Generally, as is well known, once such a motor has approached or reached a selected minimum speed normally considered the operating speed, the starting winding is disconnected from the circuit. In the present invention, the starting winding 4 is interconnected to the power lines 2 through a unique switching circuit including a pair of triggered rectifiers 5 and 6 connected to conduct the opposite half cycles of the incoming power supply in series with the start winding 4.

Each of the rectifiers 5 and 6 may be of a well known silicon controlled variety and the rectifier 5 is a described and corresponding elements of rectifier 6 are identified by similar primed numbers. Rectifier 5 includes a cathode 7 connected to one side of line 2 and an anode 8 connected to one side of the starting winding 4. A diode 9 interconnects the opposite side of the starting winding 4 to the opposite side of power lines 2. The diode is polarized to conduct in the forward conduction direction of the silicon controlled rectifier 5.

Rectifier 5 further includes a gate 10 adapted to control conduction therethrough in a known manner. Thus when the anode 8 is positive with respect to the cathode 7 and a gate signal is applied to the gate 10, the rectifier conducts current and continues to conduct as long as the anode 8 is held positive with respect to the cathode. The rectifier 5 is illustrated to polarize to conduct from the top power line 2 to the bottom power line 2.

The silicon controlled rectifier 6 is similarly constructed but has its anode 8' connected to the opposite end of the start winding and its cathode 7' connected to the top power line. The rectifier 6 is thus in parallel with the diode 9 and polarized to conduct in the opposite direction. A diode 11 is similarly paralleled with the rectifier 5 and polarized to conduct in the opposite direction and thus completes the current path through the rectifier 6 during the opposite half cycle of the incoming power voltage.

Each of the rectifiers 5 and 6 is similarly triggered from a pulsating direct current source means 12 and 13 connected across the incoming power lines 2. The pulsating source means 12 for the rectifier 5 is described in detail with the corresponding elements of the pulsing circuit for the rectifier 6 identified by similar primed numbers.

The pulsating source means 12 includes a voltage dividing network including a pair of series connected resistors 14 and 15 in series with a diode 16 connected directly across the incoming power lines 2 by the switch 3. The diode 16 conducts current through the voltage dividing network through the same half cycle that the rectifier 5 is biased to conduct by the incoming power. A timing capacitor is connected in series with a diode 18 to the junction of resistors 14 and 15 and in series with a resistor 19 to the lower power line 2 across the resistor 15 in series with diode 16. Thus, the voltage appearing across the resistor 15 and diode 16 is impressed across the capacitor 17 and the gate to cathode circuit of the rectifier 5 to charge the capacitor. The gate 10 is connected to the junction of the capacitor 17 and the resistor 19.

During the corresponding half cycle, when the upper power line is positive and current flows down through the resistors 14 and 15 and the diode 16, current also flows through diode 18, capacitor 17 and the emitter-cathode circuit of the rectifier 5 and providing a turn-on current thereto. As a result, the rectifier 5 is fired to conduct essentially immediately with the initiation of the half cycle.

Gate current flows until the capacitor 17 approaches a fully charged state at which time they will back bias the circuit and prevent gate current flow. The circuit is established such that the capacitor 17 is not charged to a turn-off point during each half cycle but rather such that the pulsating current provides an accumulative charge on the capacitor 17. A number of half cycles must thus be completed after application of the power to the motor and particularly the starting and running windings to charge capacitor 17 to the turn-off level. Consequently, the starting winding 4 is provided with current and inserted in the circuit through the controlled and timed energization of rectifier 5 for a selected time period.

The rectifier is similarly controlled during the opposite half cycle to maintain proper phased energization of winding 4 for the selected time period.

A resistor 20 is connected across the capacitor 17 to provide a capacitor discharge path when power is removed. The time constant is such that the capacitor does not discharge appreciably between half cycles of the incoming power. Consequently, once the capacitors 17 and 17' are charged to turn off the silicon controlled rectifiers 5 and 6, they are maintained in the fully charged state and hold open the circuit to the starting winding 4 as long as the motor is continuously energized. However, when the switch 3 opens and the incoming power is removed, the capacitors 17 and 17' discharge through the corresponding resistors 20 and 20' to reset the timing and charging circuits for the next cycle. The discharge time is thus preferably selected to be long relative to the incoming power frequency. Further, the discharge time is preferably sufficiently long to prevent recycling or energization of the start winding 4 as a result of momentary opening of the power circuit. For example, the discharge time may be of the order of four seconds. This will eliminate for all practical purposes the recycling due to momentary type power interruptions.

General Electric has developed a solid state rectifier known as a "Triac" having a single control gate which functions as a dual controlled rectifier to conduct alternate half cycles of an alternating current input in response to gate current at the single gate. As applied to the present invention, the rectifier would be connected in series with the start winding and single timing circuit such as shown in the drawing with diode 16 removed to provide continuous gate current during a fixed start time. Further, the motor is particularly useful in operating a relatively fixed known load 20, as diagrammatically illustrated, such that the starting time can be preset and will be maintained for each starting cycle.

The present invention thus provides a solid state control based on a completely novel timed concept in contrast to the speed and current sensitive systems heretofore widely employed. The present invention employs only solid state active elements which may be readily incorporated into a small compact package. As the starting control circuit employs only passive and solid state elements connected directly to the power lines to provide a timing control rather than a current or speed sensitive control, it is substantially simplified over the prior art type controls.

Various modes of carrying out the invention are contemplated as being within the scope of the following claims particularly pointing out and distinctly claiming the subject matter which is regarded as the invention.

I claim:

1. In an alternating current motor having a start winding and a run winding interconnected to incoming power line means, the improvement in the connection of the start winding to said power line means comprising,
    switching means connected between the start winding and the power lines and having a voltage responsive operating means for the switch means, and
    presettable timing means including a capacitor and an impedance element connected directly to the power line to establish a timing voltage independent of the operation of the motor and connected to energize the voltage responsive operating means of said switching means for a predetermined time in response to application of power to said windings.

2. The improvement in the alternating current motor of claim 1, wherein
    the switching means is a controlled rectifier means having a firing element connected to the junction of the capacitor and the impedance element.

3. The improvement in the alternating current motor of claim 1 wherein the switching means includes controlled rectifier means connected in oppositely polarized paths with the start winding being common to both paths across the power line means, and said presettable timing means includes a capacitor and impedance element for each rectifier means connected to the power line means and providing a firing current to the controlled rectifier means until the capacitor is charged.

4. The improvement in the alternating current motor of claim 1 wherein the switching means includes a pair of controlled rectifiers connected in oppositely polarized conducting branch circuits with the start winding forming a common part of both branch circuits across the power line means, and said presettable timing means includes separate firing circuits for each rectifier, each firing circuit including a capacitor and an impedance element and a unidirectional conducting means polarized to conduct in the same direction as the corresponding controlled rectifier connected in a charging circuit to the power line means and providing a firing current to the controlled rectifier during the corresponding half cycle of the incoming power until the capacitor is charged to a selected level.

5. The improvement of claim 4 including a separate discharge means for each of said capacitor means, the timing constant of the capacitor means and discharge means being a substantial multiple of half cycles of the incoming power.

6. The improvement in the alternating current motor of claim 4 wherein each branch circuit includes the rectifier and a protective diode in series with the start winding, said rectifier and diode of each branch circuit being on opposite sides of the start winding and being similarly polarized and the rectifier and diode of the one branch circuit being respectively located in parallel with the diode and rectifier of the second branch circuit.

7. The improvement in the alternating current motor of claim 6 wherein the separate firing circuits each includes a pair of resistors in series with a protective diode connected across the power line means and a capacitor in series with a blocking diode and a resistor connected across the one resistor of said pair and the protective diode, said protective and blocking diodes being polarized in the same direction as the corresponding rectifier, and a discharge resistor is connected across the timing capacitor.

8. The improvement in the alternating current motor of claim 7 wherein the time constant of said capacitor and series resistor is a substantial multiple of half cycles of the incoming alternating current voltage and the time constant of said capacitor and the discharge resistor is of the order of four seconds to prevent energization of the start winding in response to momentary interruptions in the power connection.

9. The improvement in the connection of the start winding of claim 1, wherein the switching means includes first and second energizing circuits connected across the power line means and each including a silicon controlled rectifier, a protective diode and the start winding, the rectifier and diode of the first circuit being on opposite sides of the start winding and being similarly polarized to conduct a first half cycle, and the rectifier and diode of the second circuit being on opposite sides of the start winding and being similarly polarized to conduct the opposite half cycle, and first and second firing circuits one for each energizing circuit and each including a pair of divider resistors in series with a directional diode connected across the power line means and a timing capacitor in series with a blocking diode and a charging resistor connected across the one resistor of said pair and the directional diode, said directional and blocking diodes being polarized in the same direction as the corresponding rectifier, said firing circuit including a first discharge resistor connected across the timing capacitor, the time constant of said timing capacitor and charging resistor being a substantial multiple of half cycles of the incoming alternating current voltage and the discharge time constant of the discharge resistor and timing capacitor being selected to prevent effective discharge of said capacitor during momentary power interruptions.

10. In combination with the alternating current motor of claim 1, a substantially fixed load connected to be driven by the motor.

References Cited

UNITED STATES PATENTS

| | | | |
|---|---|---|---|
| 2,987,066 | 6/1961 | Cushing et al. | 318—221 XR |
| 3,116,445 | 12/1963 | Wright | 318—220 |
| 3,226,620 | 12/1965 | Elliott et al. | 318—221 |
| 3,414,789 | 12/1968 | Prouty | 318—221 |

ORIS L. RADER, Primary Examiner

G. RUBINSON, Assistant Examiner

U.S. Cl. X.R.

318—227, 478, 479